United States Patent
Kiribuchi

(10) Patent No.: US 10,356,006 B2
(45) Date of Patent: Jul. 16, 2019

(54) CONTROL SYSTEM, DEVELOPMENT SUPPORT APPARATUS, CONTROLLER, AND CONTROL METHOD

(71) Applicant: OMRON Corporation, Kyoto-shi, Kyoto (JP)

(72) Inventor: Takeshi Kiribuchi, Osaka (JP)

(73) Assignee: OMRON Corporation, Kyoto-shi (JP)

( * ) Notice: Subject to any disclaimer, the term of this patent is extended or adjusted under 35 U.S.C. 154(b) by 342 days.

(21) Appl. No.: 15/114,570

(22) PCT Filed: Jan. 15, 2015

(86) PCT No.: PCT/JP2015/050899
§ 371 (c)(1),
(2) Date: Jul. 27, 2016

(87) PCT Pub. No.: WO2015/122232
PCT Pub. Date: Aug. 20, 2015

(65) Prior Publication Data
US 2016/0344653 A1 Nov. 24, 2016

(30) Foreign Application Priority Data
Feb. 14, 2014 (JP) .................. 2014-026821

(51) Int. Cl.
*G06F 15/16* (2006.01)
*H04L 12/911* (2013.01)
(Continued)

(52) U.S. Cl.
CPC .......... *H04L 47/781* (2013.01); *H04L 7/0091* (2013.01); *H04L 12/403* (2013.01);
(Continued)

(58) Field of Classification Search
CPC ..... H04L 47/781; H04L 67/125; H04L 47/36; H04L 7/0091; H04L 47/24; H04L 12/403; H04L 12/423; G05B 2219/31115
See application file for complete search history.

(56) References Cited

U.S. PATENT DOCUMENTS

| 2005/0083954 A1* | 4/2005 | Meyer-Grafe ........ H04L 12/403 370/403 |
| 2011/0019698 A1 | 1/2011 | Akae et al. |
| 2011/0019748 A1 | 1/2011 | Burns et al. |

FOREIGN PATENT DOCUMENTS

| CN | 1581815 A | 2/2005 |
| JP | 2000-259520 A | 9/2000 |

(Continued)

OTHER PUBLICATIONS

The Japanese Office Action (JPOA) dated Mar. 13, 2018 in a counterpart Japanese patent application.
(Continued)

*Primary Examiner* — Padma Mundur
(74) *Attorney, Agent, or Firm* — Metrolexis Law Group, PLLC

(57) ABSTRACT

A master device includes an execution unit that repeatedly executes a program including input and output processes in slave devices. The execution unit executes the program to calculate first data and second data. The master device includes an assignment unit that assigns, in accordance with a first transmission period that is set to an integer multiple of the control period for the first data and a second transmission period that is set to an integer multiple of the control period for the second data and longer than the first transmission period, the first data to a packet in every first transmission period and the second data to a packet in every second transmission period.

17 Claims, 11 Drawing Sheets

(51) Int. Cl.
  *H04L 12/403* (2006.01)
  *H04L 12/423* (2006.01)
  *H04L 7/00* (2006.01)
  *H04L 12/851* (2013.01)
  *H04L 12/805* (2013.01)
  *H04L 29/08* (2006.01)

(52) U.S. Cl.
  CPC ............ *H04L 12/423* (2013.01); *H04L 47/24* (2013.01); *H04L 47/36* (2013.01); *H04L 67/125* (2013.01); *G05B 2219/31115* (2013.01)

(56) References Cited

FOREIGN PATENT DOCUMENTS

| | | |
|---|---|---|
| JP | 2006-319381 A | 11/2006 |
| JP | 2010-178098 A | 8/2010 |
| JP | 2010-287959 A | 12/2010 |
| JP | 2011-512094 A | 4/2011 |
| JP | 2012-094944 A | 5/2012 |
| JP | 2013-55593 A | 3/2013 |

OTHER PUBLICATIONS

The office action dated Aug. 22, 2017 in a counterpart Japanese patent application.
Chinese Office Action (CNOA) dated Feb. 25, 2019 in a counterpart Chinese patent application.

\* cited by examiner

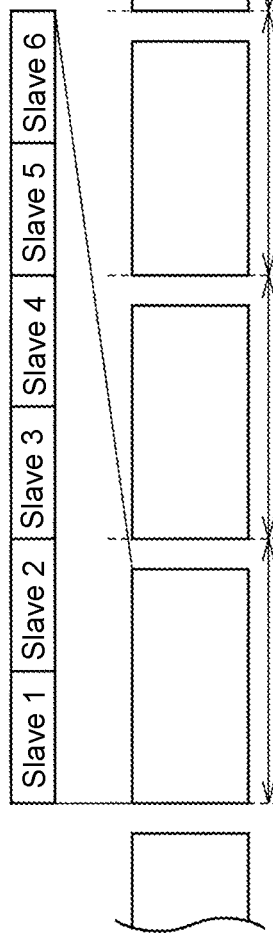
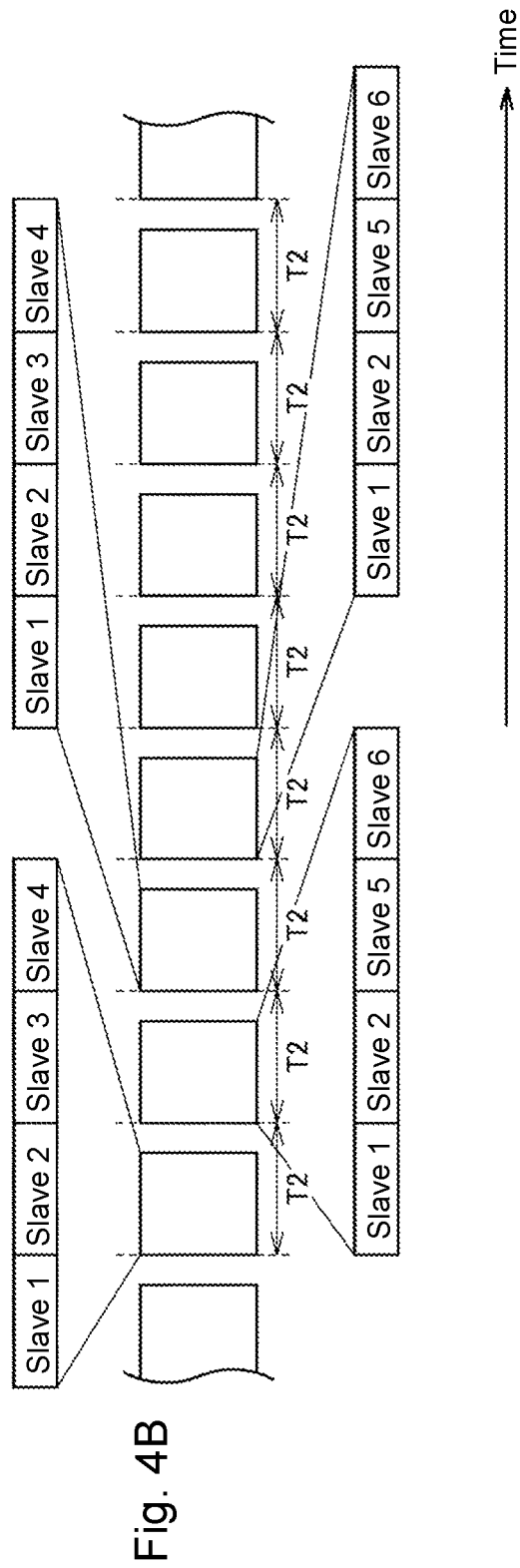
Fig. 4A
Fig. 4B

Fig. 6

| Information | Transmission period | | Packet occupied time | | Number of data elements | | Sync | Communication frequency | | Control period | |
|---|---|---|---|---|---|---|---|---|---|---|---|
| A(n) | As | 250 | Ap | 30 | Ac | 3 | O | Af | 0.5 | Tc | 125 |
| B(n) | Bs | 500 | Bp | 35 | Bc | 4 | | Bf | 0.25 | | |
| C(n) | Cs | 1000 | Cp | 35 | Cc | 4 | | Cf | 0.125 | | |
| D(n) | Ds | 1000 | Dp | 30 | Dc | 1 | O | Df | 0.125 | | |
| ⋮ | | | | | | | | | | | |
| ⋮ | | | | | | | | | | | |

Relationship of communication frequency
Af>Bf> Cf, Df

Fig. 7A

| Nt1 | Nt2 | Nt3 | Nt4 | Nt5 | Nt6 | Nt7 | Nt8 | Nt9 | Nt10 | Nt11 | Nt12 | Nt13 | Nt14 |
|---|---|---|---|---|---|---|---|---|---|---|---|---|---|
| A(1) |  | A(1) |  | A(1) |  | A(1) |  | A(1) |  | A(1) |  | A(1) |  |
| A(2) |  | A(2) |  | A(2) |  | A(2) |  | A(2) |  | A(2) |  | A(2) |  |
| A(3) |  | A(3) |  | A(3) |  | A(3) |  | A(3) |  | A(3) |  | A(3) |  |
| D(1) |  |  |  |  |  |  |  | D(1) |  |  |  |  |  |

Fig. 7B

| Nt1 | Nt2 | Nt3 | Nt4 | Nt5 | Nt6 | Nt7 | Nt8 | Nt9 | Nt10 | Nt11 | Nt12 | Nt13 | Nt14 |
|---|---|---|---|---|---|---|---|---|---|---|---|---|---|
| A(1) | B(1) | A(1) | B(4) | A(1) | B(1) | A(1) | B(4) | A(1) | B(1) | A(1) | B(4) | A(1) |  |
| A(2) | B(2) | A(2) |  | A(2) | B(2) | A(2) |  | A(2) | B(2) | A(2) |  | A(2) |  |
| A(3) | B(3) | A(3) |  | A(3) | B(3) | A(3) |  | A(3) | B(3) | A(3) |  | A(3) |  |
| D(1) |  |  |  |  |  |  |  | D(1) |  |  |  |  |  |

Fig. 7C

| Nt1 | Nt2 | Nt3 | Nt4 | Nt5 | Nt6 | Nt7 | Nt8 | Nt9 | Nt10 | Nt11 | Nt12 | Nt13 | Nt14 |
|---|---|---|---|---|---|---|---|---|---|---|---|---|---|
| A(1) | B(1) | A(1) | B(4) | A(1) | B(1) | A(1) | B(4) | A(1) | B(1) | A(1) | B(4) | A(1) |  |
| A(2) | B(2) | A(2) | C(1) | A(2) | B(2) | A(2) | C(3) | A(2) | B(2) | A(2) | C(1) | A(2) |  |
| A(3) | B(3) | A(3) | C(2) | A(3) | B(3) | A(3) | C(4) | A(3) | B(3) | A(3) | C(2) | A(3) |  |
| D(1) |  |  |  |  |  |  |  | D(1) |  |  |  |  |  |

Fig. 8

| | Nt1 | Nt2 | Nt3 | Nt4 | Nt5 | Nt6 | Nt7 | Nt8 | Nt9 | Nt10 | Nt11 | Nt12 | Nt13 | Nt14 |
|---|---|---|---|---|---|---|---|---|---|---|---|---|---|---|
| | 30 | 35 | 30 | 35 | 30 | 35 | 30 | 35 | 30 | 35 | 30 | 35 | 30 | |
| | 30 | 35 | 30 | 35 | 30 | 35 | 30 | 35 | 30 | 35 | 30 | 35 | 30 | |
| | 30 | 35 | 30 | 35 | 30 | 35 | 30 | 35 | 30 | 35 | 30 | 35 | 30 | |
| | 30 | none | none | none | none | none | none | none | 30 | none | none | none | none | |
| | 120 | 105 | 90 | 105 | 90 | 105 | 90 | 105 | 120 | 105 | 90 | 105 | 90 | |
| | 0.96 | 0.84 | 0.72 | 0.84 | 0.72 | 0.84 | 0.72 | 0.84 | 0.96 | 0.84 | 0.72 | 0.84 | 0.72 | |

← Total occupied time of each packet
← Occupied ratio of each packet

CONTROL SYSTEM, DEVELOPMENT SUPPORT APPARATUS, CONTROLLER, AND CONTROL METHOD

FIELD

The present invention relates to a control system for controlling a target, a development support apparatus and a controller for the control system, and a control method.

BACKGROUND

Machines and equipment used at many production sites are typically controlled by a control system including, for example, programmable logic controllers (PLCs). The control system uses remote devices installed at separate positions in the field, and provides command values to these remote devices and collect field information from each remote device. The command values and the field information are transmitted with a field network.

The control system includes remote devices with different capabilities. For these remote devices, command values may be updated in periods optimum for their capabilities.

Techniques for transmitting data with networks have been developed to optimize data sequences in the order of priorities in correspondence with bandwidths (e.g., Japanese Unexamined Patent Application Publication No. 2012-094944, or Patent Literature 1).

CITATION LIST

Patent Literature

Patent Literature 1: Japanese Unexamined Patent Application Publication No. 2012-094944

SUMMARY

Technical Problem

The communication bandwidth controller described in Japanese Unexamined Patent Application Publication No. 2012-094944 (Patent Literature 1) controls bandwidths precisely in accordance with the priority of transmission requests in point-to-multipoint communications between a communication driver and tasks. In contrast, the control system described above uses a network with predefined control periods and predefined bandwidths, and cannot use the technical idea of dynamically changing the bandwidth for every transmission of data.

In response to this issue, one or more aspects of the present invention are directed to a control system including a master device and a plurality of slave devices connected with a network in which data is transmitted to each slave device in periods optimum for each slave device.

Solution to Problem

One aspect of the present invention provides a control system for controlling a control target. The system includes a master device, and a plurality of slave devices connected to the master device with a network. The master device transmits packets onto the network in every one or more predetermined control periods. The plurality of slave devices sequentially transfer packets transmitted from the master device. The master device includes an execution unit that repeatedly executes a program including input and output processes performed in the slave devices to calculate first data and second data. The master device includes an assignment unit that assigns, in accordance with a first transmission period that is set to an integer multiple of the control period for the first data and a second transmission period that is set to an integer multiple of the control period for the second data and longer than the first transmission period, the first data to a packet in every first transmission period and the second data to a packet in every second transmission period. The master device stores each of the first data and the second data in the packet together with information indicating a slave device that is a transmission destination of the packet. Each of the plurality of slave devices extracts data intended for the slave device from data included in a packet transmitted from the master device.

In some embodiments, the assignment unit determines packets to which the first data and the second data are to be assigned in a manner not to exceed a maximum permissible data size of each packet.

In some embodiments, the assignment unit sequentially determines, for a plurality of transmission target data sets each having a transmission period being set, assignment setting of the transmission target data sets to packets in the order of shorter transmission periods of the data sets.

In some embodiments, the second data includes a plurality of data elements. The assignment unit determines assignment setting of the second data to packets to assign the plurality of data elements included in the second data to the same packet when the second data has synchronization transmission setting, and to assign the plurality of data elements included in the second data to a plurality of packets when the second data has no synchronization transmission setting.

In some embodiments, the assignment unit determines, among the plurality of transmission target data sets, assignment setting of data sets having synchronization transmission setting to packets with a higher priority than other data sets.

In some embodiments, the assignment unit includes a unit that notifies an occupied state of each packet by data assigned to each packet.

In some embodiments, the assignment unit includes a unit that provides a prompt to change predetermined communication parameters including the control period, the first transmission period, and the second transmission period when being unable to determine assignment setting of the first data and the second data in accordance with the predetermined communication parameters.

Another aspect of the present invention provides a development support apparatus for a control system that controls a control target. The control system includes a master device and a plurality of slave devices connected to the master device with a network. The master device transmits packets onto the network in every predetermined control period. The plurality of slave devices sequentially transfer packets transmitted from the master device. The development support apparatus includes a unit that receives, when the master device repeatedly executes a program including input and output processes performed in the slave devices to calculate first data and second data, predetermined communication parameters including a first transmission period that is set to an integer multiple of the control period for the first data and a second transmission period that is set to an integer multiple of the control period for the second data and longer than the first transmission period, and an assignment determination unit that determines assignment setting to assign the first data to a packet in every first transmission period and assigns the second data to a packet in every second transmission period.

A still another aspect of the present invention provides a controller connected to a plurality of slave devices with a network. The controller transmits packets onto the network in every one or more predetermined control periods. The plurality of slave devices sequentially transfer packets transmitted from the controller. The controller includes an execution unit that repeatedly executes a program including input and output processes performed in the slave devices to calculate first data and second data, and an assignment unit that assigns, in accordance with a first transmission period that is set to an integer multiple of the control period for the first data and a second transmission period that is set to an integer multiple of the control period for the second data and longer than the first transmission period, the first data to a packet in every first transmission period and the second data to a packet in every second transmission period. The controller stores each of the first data and the second data in the packet together with information indicating a slave device that is a transmission destination of the packet. Each of the plurality of slave devices extracts data intended for the slave device from data included in a packet transmitted from the controller.

A still another aspect of the present invention provides a development support apparatus for a control system that controls a control target. The control system includes a master device and a plurality of slave devices connected to the master device with a network. The master device transmits packets onto the network in every one or more predetermined control periods. The plurality of slave devices sequentially transfer packets transmitted from the master device. The master device includes an execution unit that repeatedly executes a program including input and output processes performed in the slave devices to calculate first data and second data. The development support apparatus determines assignment setting to assign the first data to a packet in every first transmission period and the second data to a packet in every second transmission period in accordance with a first transmission period that is set to an integer multiple of the control period for the first data and a second transmission period that is set to an integer multiple of the control period for the second data and longer than the first transmission period.

A still another aspect of the present invention provides a control method implemented in a control system that controls a control target. The control system includes a master device and a plurality of slave devices connected to the master device with a network. The control method includes allowing the master device to transmit packets onto the network in every one or more predetermined control periods, and allowing the plurality of slave devices to sequentially transfer packets transmitted from the master device, allowing the master device to repeatedly execute a program including input and output processes performed in the slave devices to calculate first data and second data, assigning, in accordance with a first transmission period that is set to an integer multiple of the control period for the first data and a second transmission period that is set to an integer multiple of the control period for the second data and longer than the first transmission period, the first data to a packet in every first transmission period and the second data to a packet in every second transmission period, allowing the master device to store each of the first data and the second data in the packet together with information indicating a slave device that is a transmission destination of the packet, and allowing each of the plurality of slave devices to extract data intended for the slave device from data included in a packet transmitted from the master device.

Advantageous Effects

The control system according to the aspect of the present invention enables data transmission in periods optimum for each slave device.

BRIEF DESCRIPTION OF THE DRAWINGS

FIGS. 4A and 4B are diagrams describing the overall processing performed by the PLC system according to the present embodiment.

FIG. 6 is a table showing communication parameters used in the PLC system according to the present embodiment.

FIGS. 7A to 7C are diagrams describing a packet generation process performed in accordance with the communication parameters shown in FIG. 6 in one example.

FIG. 8 is a table showing the total occupied time and the occupied ratio of each packet when the output information set shown in FIG. 7C is assigned to packets.

DETAILED DESCRIPTION

Figure 1:
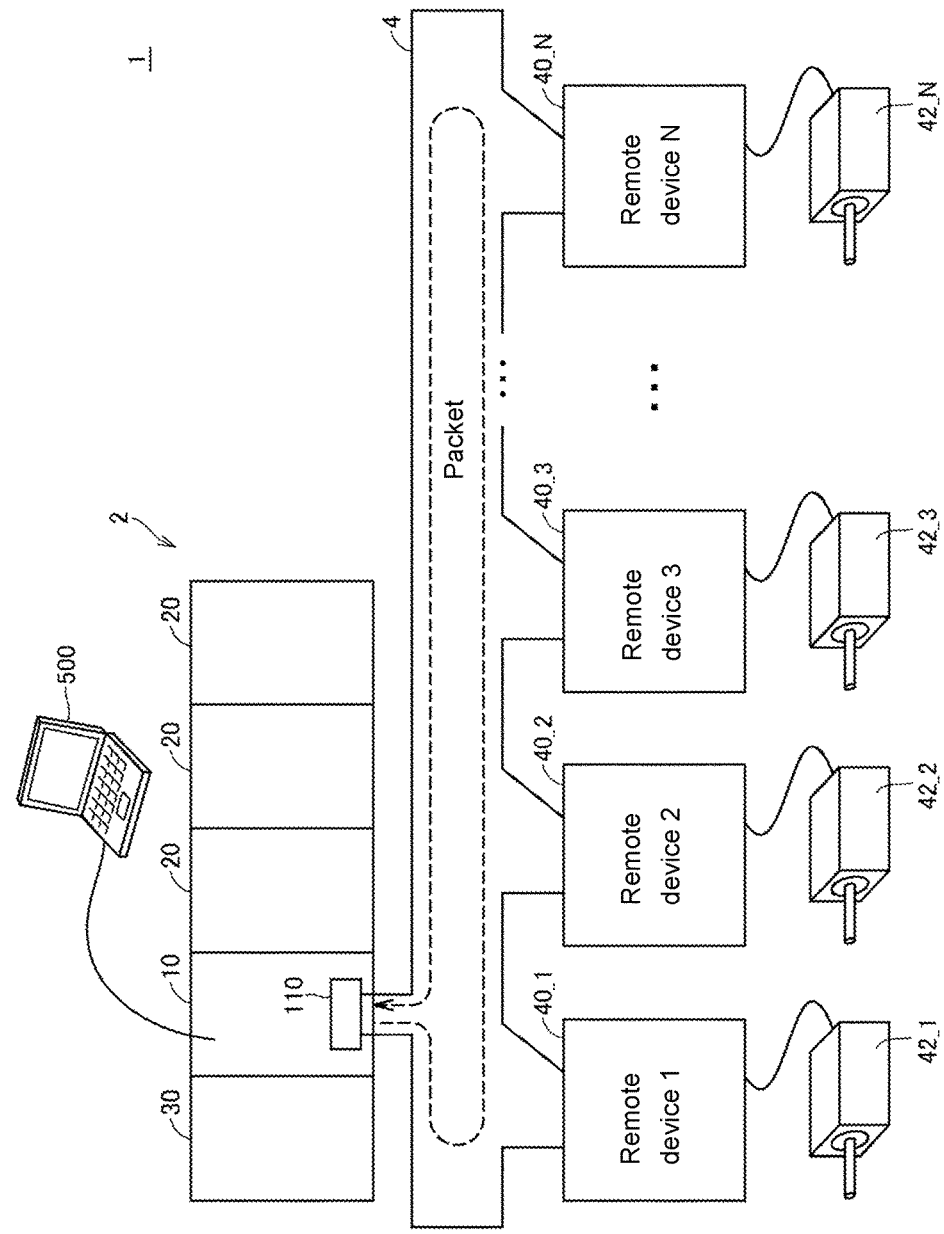
FIG. 1 is a schematic diagram showing the overall configuration of a PLC system according to one embodiment of the present invention.

Embodiments of the present invention will now be described with reference to the drawings. The same or corresponding components in the figures are given the same reference numerals, and will not be described redundantly.

A control system according to the present embodiment mainly includes programmable logic controllers (PLCs). However, the control system may not be such a PLC system, but may mainly include various industrial computers. The system may further use a new processing device (computation device) that may emerge through technological advancements.

A. Overall Configuration of the PLC System

The overall configuration of the PLC system according to the present embodiment will now be described. FIG. 1 is a schematic diagram showing the overall configuration of the PLC system 1 according to the present embodiment.

Referring now to FIG. 1, the PLC system 1 is a control system for controlling targets, and includes a main processing device 2 and a plurality of remote devices 40_1, 40_2, and 40_3, and to 40_N (these units may hereafter be collectively referred to as remote devices 40). The main processing device 2 and the remote devices 40 are controllers constituting at least a portion of the PLC system 1, and are connected to each other with a field network 4.

The communications with the field network 4 are centrally controlled by the main processing device 2. More specifically, the main processing device 2 transmits data, which is to be sequentially transmitted on the field network 4, at predetermined timings or in accordance with predetermined rules. The data to be sequentially transmitted on the field network 4 is also referred to as packets. The main processing device 2 can also be referred to as a master device, and each of the remote devices 40_1, 40_2, and 40_3 to 40_N can also be referred to as a slave device. In other words, the PLC system 1 as a control system includes the main processing device 2 (master device), and the plurality of remote devices 40 (slave devices) connected to the main processing device 2 (master device) with the field network 4.

The main processing device 2 executes programs (including user programs and system programs as described later) for controlling control targets to implement processes of, for example, collecting input signals from the remote devices 40 (hereinafter also referred to as field information), performing control computations based on the collected field information, and outputting command values calculated through such computations to the remote devices 40.

The main processing device 2 includes a CPU 10, one or more IO units 20, and a power supply unit 30 as its hardware components. The CPU 10 and the IO units 20 are connected to each other with an internal bus (not shown) to allow data communications between them. The power supply unit 30 supplies power with an appropriate voltage to the CPU 10 and the IO units 20.

The CPU 10 includes a computation unit for executing programs to control a control target, and a communication processing unit 110 for controlling communications with the remote devices 40 via the field network 4.

The CPU 10 may be connected to a development support apparatus 500, which can install various programs, debug the programs, and monitor the execution status of the programs. The development support apparatus 500 is typically implemented by executing a support program on a general-purpose computer. The support program may have capabilities of simulatively executing various programs by emulating the CPU 10.

Each remote device 40 receives field information from an external switch or sensor, and transmits the received field information to the main processing device 2 via the field network 4. The remote device 40 also outputs a command value received from the main processing device 2 via the field network 4 to an external relay or actuator. The remote device 40 may also operate independently in accordance with the command value received via the field network 4. For example, the remote device 40 may be a simple IO unit having no computation function, an IO unit having a computation function, or a device including an actuator, such as a servo driver.

The remote devices 40 in FIG. 1 are servo drivers. Servo motors 42_1, 42_2, and 42_3 to 42_N (these motors may hereafter be collectively referred to as servo motors 42) are connected to the remote devices 40_1, 40_2, and 40_3 to 40_N. Each servo motor is controlled through the corresponding remote device in accordance with an instruction from the main processing device 2.

The communication processing unit 110 included in the CPU 10 manages cyclic transmission of data sequences (packets) including data handled by the main processing device 2 (master device) and the remote devices 40 (slave devices) on the field network 4. A packet is transmitted in every one or more predetermined control periods. More specifically, the main processing device 2 (master device) transmits a packet onto the field network 4 in every one or more predetermined control periods. Each remote device 40 (slave device) sequentially transfers packets transmitted from the main processing device 2 (master device).

The control period herein refers to the processing time of a user program. The control period may be a predetermined fixed period, or may be changed dynamically in accordance with the volume of the user program to be executed.

Although the field network schematically shown in FIG. 1 has a ring topology, the field network may be a daisy-chain network. The field network in the present embodiment may have any topology that can allow transmission of a data sequence (packet) in every one or more predetermined control periods.

B. Hardware Configuration of CPU 10

Figure 2:
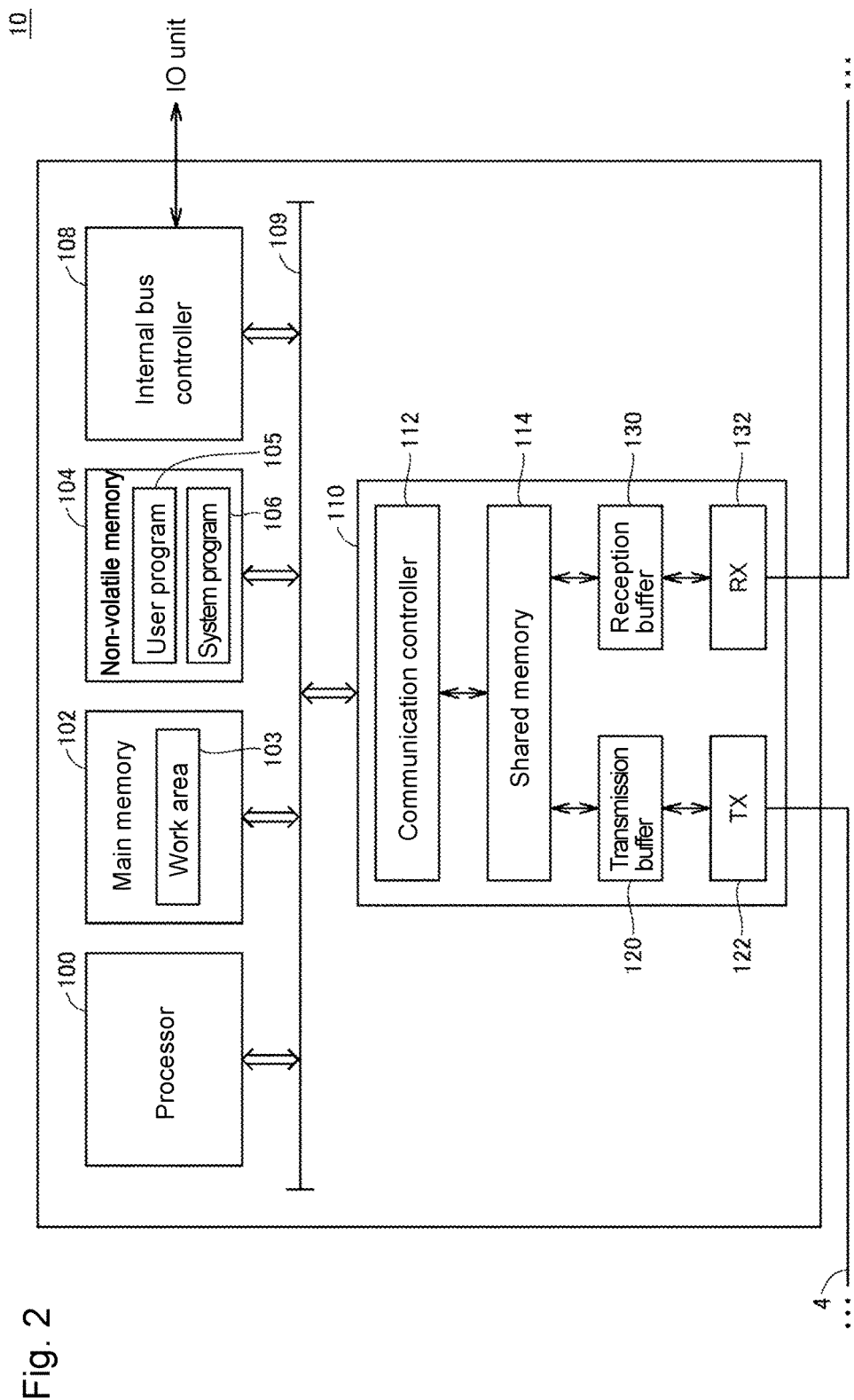
FIG. 2 is a schematic diagram of the hardware configuration of a CPU included in the PLC system according to the present embodiment.

The hardware configuration of the CPU 10 included in the PLC system 1 according to the present embodiment will now be described. FIG. 2 is a schematic diagram showing the hardware configuration of the CPU 10 included in the PLC system 1 according to the present embodiment.

As shown in FIG. 2, the CPU 10 includes a processor 100, which is a computation unit, a main memory 102, a non-volatile memory 104, and an internal bus controller 108, in addition to the communication processing unit 110. These components are connected to one another with an internal bus 109 to allow data communications between them.

The processor 100 executes programs associated with control. The processor 100 reads a program as appropriate from the non-volatile memory 104 or other storage, and expands the program in the main memory 102 and executes the program. The non-volatile memory 104 stores a user program 105 and a system program 106 as programs associated with control. Data associated with programs executed by the processor 100 is stored in a work area 103 defined in the main memory 102.

The internal bus controller 108 is connected to an IO unit 20 with the internal bus (not shown), and passes data (field information and command values) between the processor 100 and the IO unit 20.

The communication processing unit 110 is connected to the remote device 40 via the field network 4, and passes data (field information and command values) between the CPU 10 and the remote device 40. More specifically, the communication processing unit 110 includes a communication controller 112, a shared memory 114, a transmission buffer 120, a transmission circuit 122, a reception buffer 130, and a reception circuit 132.

The transmission buffer 120 and the transmission circuit 122 perform processing associated with transmission of frames from the communication processing unit 110 to an external device. The reception buffer 130 and the reception circuit 132 perform processing associated with transmission of frames from the external device to the communication processing unit 110. The communication processing unit 110 includes the shared memory 114. The processor 100 writes a calculated command value into the shared memory 114, and reads field information from the shared memory 114. In other words, the command value written in the shared memory 114 is transferred to the transmission buffer 120, and is then transmitted from the transmission buffer 120 to the remote device 40. The field information obtained from the remote device 40 is received by the reception buffer 130, and is then transferred to the shared memory 114.

The processing in the communication processing unit 110 is executed by the communication controller 112. More specifically, the communication controller 112 may generate and transmit packets in accordance with an instruction from the processor 100, and may extract information from received packets as appropriate.

Some or all components of the communication processing unit 110 may be implemented using software. Some or all components of the communication processing unit 110 may be implemented using hardware circuits such as application-specific integrated circuits (ASICs) or field programmable gate arrays (FPGAs).

C. Hardware Configuration of Remote Device 40

Figure 3:
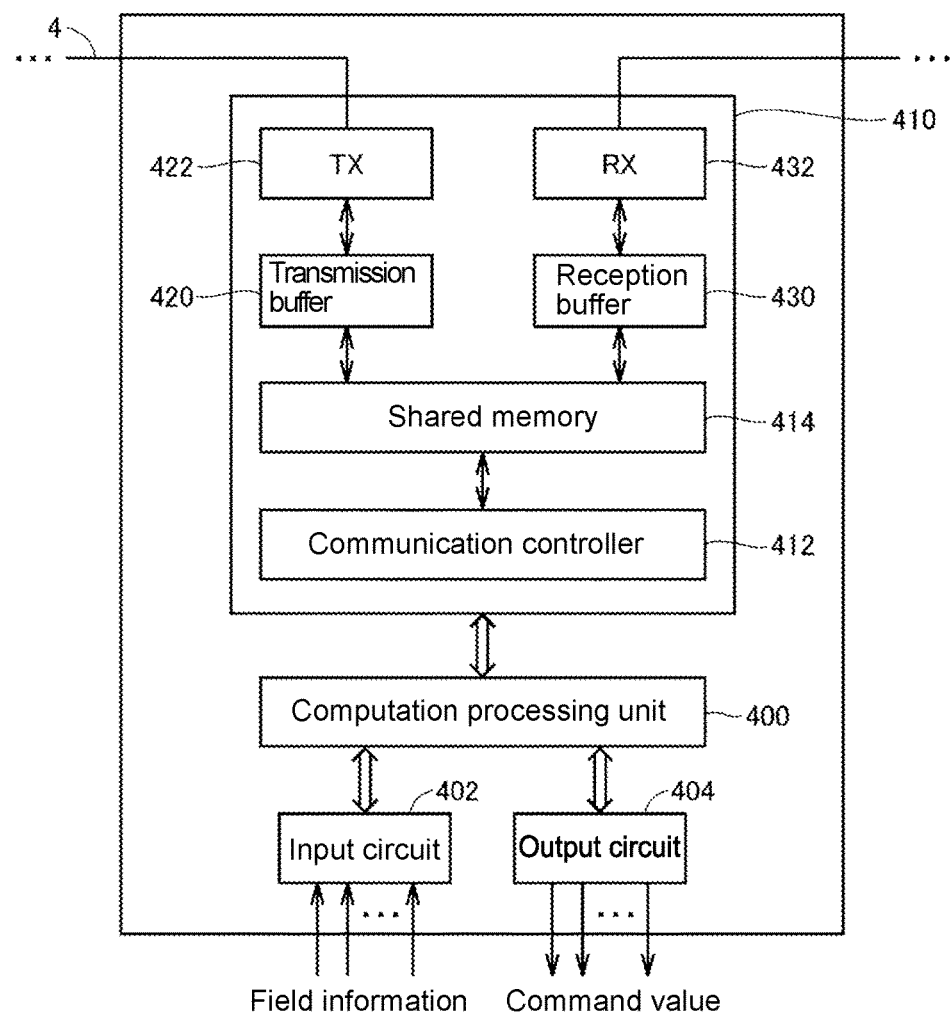
FIG. 3 is a schematic diagram showing the hardware configuration of a remote device included in the PLC system according to the present embodiment.

The hardware configuration of each remote device 40 included in the PLC system 1 according to the present embodiment will now be described. FIG. 3 is a schematic diagram showing the hardware configuration of the remote device 40 included in the PLC system 1 according to the present embodiment.

Although the remote device 40 according to the present embodiment may have various structures, the remote device 40 with the structure shown in FIG. 3 has computation capabilities and IO capabilities. As shown in FIG. 3, the remote device 40 includes a computation processing unit 400, an input circuit 402, an output circuit 404, and a communication processing unit 410.

The computation processing unit 400 performs predetermined processing based on a packet transmitted via the field network 4, and transmits the resultant packet via the field network 4.

The input circuit 402 receives a signal (field information) input from the field, and outputs the signal to the computation processing unit 400. The output circuit outputs a signal to the field in accordance with a command value provided from the computation processing unit 400.

The communication processing unit 410 is connected to the CPU 10 via the field network 4, and passes data (field information and command values) between the remote device 40 and the CPU 10. More specifically, the communication processing unit 410 includes a communication controller 412, a shared memory 414, a transmission buffer 420, a transmission circuit 422, a reception buffer 430, and a reception circuit 432. These components have the same functions as the communication controller 112, the shared memory 114, the transmission buffer 120, the transmission circuit 122, the reception buffer 130, and the reception circuit 132 described above (all shown in FIG. 2), and thus will not be described in detail. The processing of the communication processing unit 410 included in the slave device performed when receiving a packet and when transmitting a packet differs from the processing performed by the communication processing unit 110 included in the CPU 10, which is included in the master device.

Although some or all components of the remote device 40 (the computation processing unit 400, the input circuit 402, the output circuit 404, and the communication processing unit 410) may be implemented using software, some or all components of the remote device 40 may be implemented using hardware circuits such as ASICs or FPGAs.

D. Field Network 4

A communication process performed by the field network 4 will now be described.

The field network 4 may use a communication scheme that allows packet transmission in every one or more predetermined control periods (communication in real time). The field network 4 may be industrial EtherNet (registered trademark). Variants of industrial Ethernet (registered trademark) include EtherCAT (registered trademark), Profinet IRT, MECHATROLINK (registered trademark)-III, Powerlink, SERCOS (registered trademark)-III, and CIP Motion. A field network other than industrial Ethernet (registered trademark) may be used. For example, DeviceNet or CompoNet (registered trademark) may be used.

E. Overall Processing

The overall processing performed in the PLC system 1 according to the present embodiment will now be described. FIGS. 4A and 4B are diagrams describing the overall processing performed by the PLC system 1 according to the present embodiment. FIG. 4A shows the data structure of a packet with a related technique, and FIG. 4B shows the data structure of a packet according to the present embodiment.

In a typical field network, as shown in FIG. 4A, each packet stores the same type of data. In other words, each packet has the same data structure. The data set of the same type is transmitted in every one or more predetermined control periods. In the example shown in FIG. 4A, each packet contains data to be transmitted to the slaves 1 to 6.

For multi-axis control using the plurality of servo motors 42 shown in FIG. 1, for example, each packet stores command values for multiple axes. This increases the data length of the packet. A control period T1 (control period used in the remote device 40) increases in proportion to the number of axes used for a control target.

In reality, some axes may need a fast response, whereas other axes may not need a fast response. However, a system involving many axes typically transmits command values to axes that may not need a fast response in substantially the same control period as for axes that need a faster response. This can place limitations on axes that need a fast response.

The structure including a relatively large number of axes shown FIG. 4A transfers each single packet containing a set of command values intended for all the axes. The control period T1 has a length proportional to the number of axes. In other words, each servo motor 42 does not allow a response in a period shorter than the control period T1.

In contrast, the control period in the present embodiment is substantially variable in accordance with the communication speed requested in each remote device 40. In other words, the structure for controlling the plurality of servo motors 42 can set a control period for each axis in accordance with a requested response time, and generates packets in accordance with the set control period. This achieves the variably set control periods.

In the example shown in FIG. 4B, the control period T2 is for each packet. In this example, the control period T2 is set for the slaves 1 and 2, whereas the control period T2×2 is set for the slaves 3 to 6. Although every packet contains command values for the slaves 1 and 2, only alternate packets contain command values for the slaves 3 to 6. For example, odd-numbered packets contain command values for the slaves 3 and 4, whereas even-numbered packets contain command values for the slaves 5 and 6.

Such packets allow the slaves 1 and 2 to use the same control period as the control period T2, and the slaves 3 to 6 to use the control period twice the length of the control period T2. In the example shown in FIG. 4B, communication for an axis that needs a fast response is performed in every control period T, whereas communication for an axis that may not need a fast response is performed once in every multiple control periods. This control reduces the data size of a packet per communication, and shortens the control period further and achieves a faster response.

As described below, the data structure of each packet is changed dynamically in every control period in accordance with the number of slave devices included in the control system and the control period requested in each slave device in the present embodiment. This achieves intended control.

F. Packet Generation Process

Figure 5:
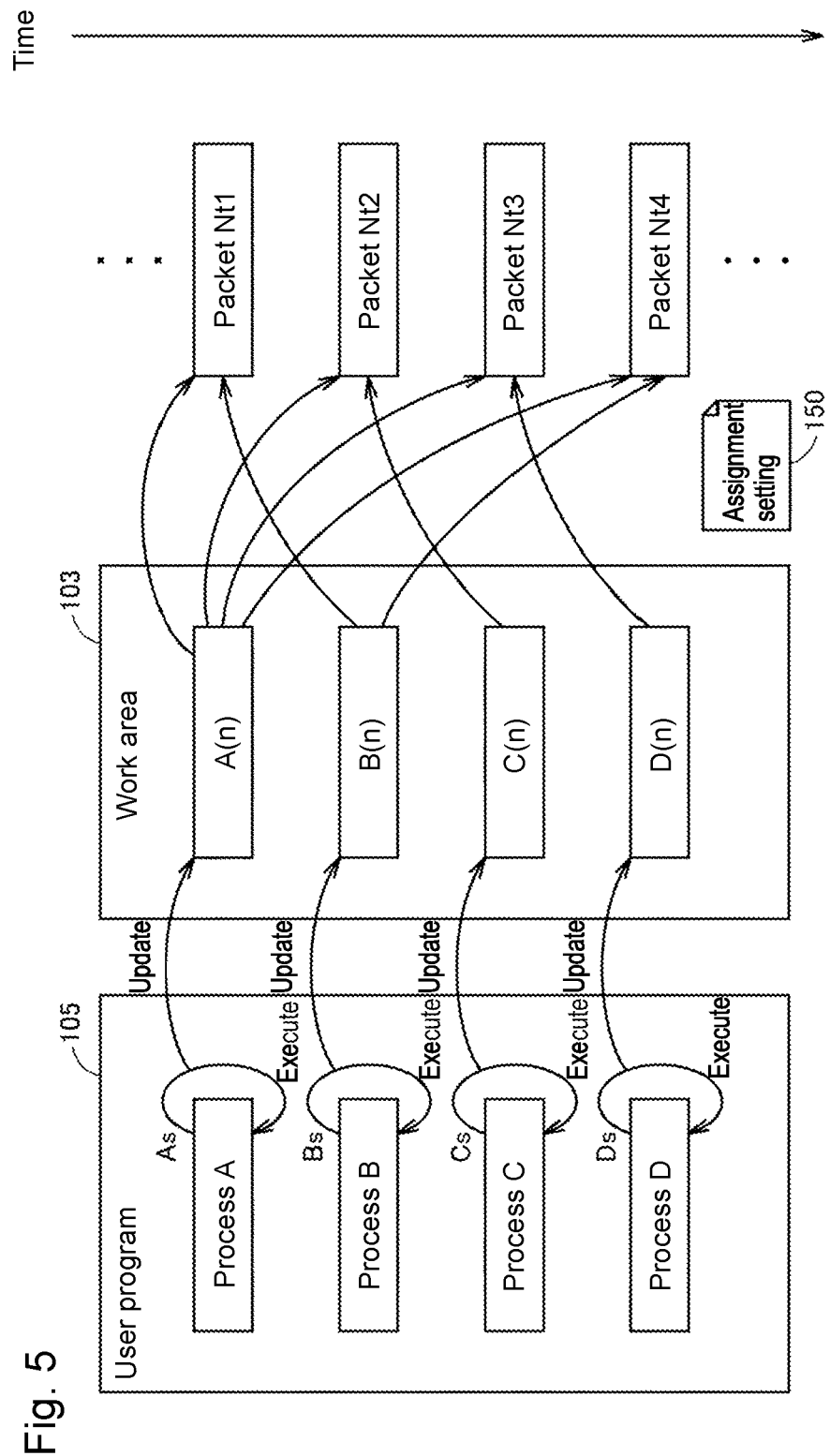
FIG. 5 is a diagram describing a packet generation process performed in the PLC system according to the present embodiment.

A packet generation process performed in the PLC system 1 according to the present embodiment will now be described. FIG. 5 is a diagram describing the packet generation process performed in the PLC system 1 according to the present embodiment.

Referring now to FIG. 5, the user program 105 contains a plurality of processes A, B, C, and D, each of which is independently performed repeatedly in predetermined control periods. The processes A, B, C, and D have transmission periods As, Bs, Cs, and Ds, respectively. The processes A, B, C, and D receive input field information collected from the remote devices 40 for example. The processes A, B, C, and D are performed to yield output information sets A(n), B(n), C(n), or D(n) (n is an integer equal to or greater than 1). For ease of explanation, the output information sets are defined in an array, but may be stored in any arrangement or any format. The output information sets A(n), B(n), C(n), and D(n) are stored in the work area 103 defined in the main memory 102, and are sequentially updated in control periods set for their corresponding processes. In other words, the main processing device 2 (master device) includes the processor 100 (execution unit) that repeatedly executes the user program 105 including input and output processes in the remote devices 40 (slave devices). The processor 100 (execution unit) executes the user program 105 to calculate data of multiple types.

The output information sets stored in the work area 103 are selected in accordance with predefined assignment setting 150. Packets Nt1, Nt2, Nt3, Nt4, . . . are generated sequentially. In the example shown in FIG. 5, the output information set A(n) calculated through the process A is assigned to each generated packet. In other words, the output information set A(n) is transmitted in every packet control period. In contrast, the communication frequency (control period/transmission period) of each of the output information sets B(n), C(n), and D(n) is set to ⅓ of the communication frequency of the output information set A(n). In this case, the output information sets B(n), C(n), and D(n) are transmitted once in every three control periods. In other words, the output information sets B(n), C(n), or D(n) are updated in every period with a length three times the length of the packet control period.

In this manner, the communication frequency (period) for data provided to the remote devices 40 is optimized in accordance with the type of the processing and/or the details of the output information sets to avoid cases in which the data size of each packet increases excessively and the control period cannot be shortened. In other words, the communication bandwidth prepared in the field network 4 can be used effectively. For the system including many remote devices 40, this structure can provide remote devices 40 that may need a fast response with command values in shorter control periods.

In the above example, the output information sets A(n), B(n), C(n), and D(n) calculated through the processing included in the user program 105 are transmitted from the main processing device 2 to the plurality of remote devices 40. The above control is also applicable to the processing in which the main processing device 2 collects field information from each of the remote devices 40. To collect field information from each remote device 40, the main processing device 2 transmits a command for obtaining field information (hereinafter also referred to as a data refresh command) to each target remote device 40. The data refresh command is transmitted in an appropriate control period in accordance with the type of the processing and/or necessary field information as described above. This structure effectively uses the communication bandwidth prepared in the field network 4, and allows data communications to satisfy the need for a fast response.

G. Specific Examples of Packet Assignment

A packet assignment process will now be described based on specific examples. Typically, the processor 100 in the CPU 10 assigns output information sets for transmission targets to packets, or in other words, determines the assignment setting 150. This processing may be performed in an off-line environment in, for example, the development support apparatus 500 connected to the CPU 10.

g1: Communication Parameters

FIG. 6 is a table showing communication parameters used in the PLC system 1 according to the present embodiment. Referring now to FIG. 6, for example, the processes A, B, C, and D are performed repeatedly. The transmission periods As, Bs, Cs, and Ds, which are the execution periods of the corresponding processes, are 250, 500, 1000, and 1000 μsec, respectively.

The processes A, B, C, and D yield the output information sets A(n), B(n), C(n), and D(n), respectively. These output information sets contain the numbers of data elements, or namely, Ac, Bc, Cc, and Dc, which are 3, 4, 4, and 1, respectively. More specifically, the output information set A(n) includes three data elements A(1), A(2), and A(3). The output information set B(n) includes four data elements B(1), B(2), B(3), and B(4). The output information set C(n) includes four data elements C(1), C(2), C(3), and C(4). The output information set D(n) includes one data element D(1).

The packet occupied times Ap, Bp, Cp, and Dp, which respectively correspond to the output information sets A(n), B(n), C(n), and D(n), indicate the occupied times to be used when the corresponding data elements are assigned to the packets. The packet occupied time can vary in accordance with the length or the type of the corresponding data element. More specifically, the packet occupied time indicates the data size of the corresponding data element. The control period Tc indicates the maximum transmission data size per packet.

The packet occupied time may not be used but the data size of each data element may be directly used for evaluation. In other words, the data size that can be assigned to each packet (maximum data size) may be determined in advance using the control period Tc, and the assignment setting may then be determined using the data size of each data element to be assigned.

In the example shown in FIG. 6, the packet occupied times Ap and Dp for the output information sets A(n) and D(n) each are 30 μsec, whereas the packet occupied times Bp and Cp for the output information sets B(n) and C(n) each are 35 μsec.

The control period Tc is a period for generating a packet. The communication frequencies Af, Bf, Cf, and Df for the processes A, B, C, and D are values each indicating the ratio occupied by the corresponding output information set to be assigned to packets using the control period Tc as a reference. For example, the communication frequency Af for the process A is 0.5, indicating that the corresponding output information set A(n) is copied into one of every two packets to be transmitted. The communication frequency Bf for the process B is 0.25, indicating that the corresponding output information set B(n) is copied into one of every four packets to be transmitted. The communication frequencies Cf and Df for the processes C and D are both 0.125, indicating that the corresponding output information sets C(n) and D(n) each are copied into one of every eight packets to be transmitted. Thus, the data elements need to be assigned to packets to set the transmission period of the output information set A(n) to the control period Tc×2, the transmission period of the output information set B(n) to the control period Tc×4, and the transmission period of each of the output information sets C(n) and D(n) to the control period Tc×8.

Among the communication parameters shown in FIG. 6, the synchronization (sync) indicates whether the data set corresponding to the output information set needs to be transmitted entirely in the same packet. For example, the output information set A(n) and the output information set D(n) each have the sync setting. In this case, the data set corresponding to each of these output information sets is entirely assigned to the same packet. In other words, the data set corresponding to each of these output information sets is to be transmitted in synchronization. In contrast, the output information sets B(n) and C(n) each have no sync setting. For each of these output information sets B(n) and C(n), different parts of the corresponding data set may be assigned to different packets. For example, motion control using three axes may have commands for different axes to be updated simultaneously. The output information used by this application may need synchronization. In contrast, the output information used independently in control may not need updating at the same timing. Such information thus has no sync setting.

g2: Packet Generation Process

FIGS. 7A to 7C are diagrams describing a packet generation process performed in accordance with the communication parameters shown in FIG. 6 in one example. Referring now to FIGS. 7A to 7C, the assignment setting in accordance with the communication parameters shown in FIG. 6 will now be described.

When the highest communication frequency (the control period/the shortest transmission period)>1, the current control period cannot achieve intended control. In this case, the transmission period, the packet occupied time, the control period, or other parameters need to be changed.

With the communication parameters shown in FIG. 6, the assignment setting is first determined to assign, with a higher priority, an output information set having a higher requested communication frequency (with a shorter requested transmission period). When one or more output information sets need synchronization, such output information sets with the sync setting are assigned with a higher priority.

With the communication parameters shown in FIG. 6, the output information sets A(n) and D(n) have the sync setting. Among these output information sets with the sync setting, the output information set A(n) has a higher communication frequency. In this case, the assignment setting is determined to assign the entire data set corresponding to the output information set A(n), which needs synchronization and has the highest communication frequency, to a packet with a frequency of once every reciprocal of the communication frequency Af (=the control period Tc/the transmission period). In the example shown in FIG. 6, the communication frequency of the output information set A(n) is 0.5, and thus the output information set A(n) is assigned to a packet once every two control periods Tc. In other words, the three data elements A(1), A(2), and A(3) included in the output information set A(n) are assigned to a single data packet.

The assignment is also optimized to prevent the total occupied time of each packet from exceeding the control period Tc when the data elements are assigned to each packet.

FIG. 7A shows an example in which the three data elements A(1), A(2), and A(3) included in the output information set A(n) are assigned to each of the odd-numbered packets, which are packets Nt1, Nt3, Nt5, Nt7, Nt9, Nt11, Nt13, . . . .

In the state shown in FIG. 7A, the total occupied time of each odd-numbered packet occupied by the output information set A(n) is the packet occupied time Ap×the number of data elements Ac=90 μsec. This satisfies the condition: the packet occupied time Ap×the number of data elements Ac<the control period Tc (125 μsec).

Second, the assignment setting is determined to assign the entire data set corresponding to the other output information set D(n) with the sync setting to a packet with a frequency of once every reciprocal of the communication frequency Df. The communication frequency of the output information set Ds(n) is 0.125, and thus the output information set D(n) is assigned to a packet once every eight control periods Tc. In the state shown in FIG. 7A, the odd-numbered packets still have space. In this example, the single data element D(1) included in the output information set D(n) is assigned to each of the packets Nt1, Nt9, . . . .

In this state, the total packet occupied time of each of the first packet, the ninth packet, the seventeenth packet, . . . is the packet occupied time Ap×the number of data elements Ac+the packet occupied time Dp×the number of data elements Dc=120 μsec. This satisfies the condition for the control period Tc (125 μsec).

If the condition for the total occupied time is not satisfied after the output information sets with the sync setting are assigned to packets in the manner described above, the transmission period, the packet occupied time, the control period, and other parameters need to be changed.

As described above, the main processing device 2 (master device) determines the assignment setting in accordance with the first transmission period that is set to an integer multiple (×2) of the control period Tc for the output information set A(n) (first data), and the second transmission period that is set to an integer multiple (×8) of the control period Tc for the output information set D(n) (second data) and longer than the first transmission period. The assignment setting is determined to assign, in every first transmission period, the output information set A(n) (first data) to a packet transmitted in every control period, and assign, in every second transmission period, the output information set D(n)

(second data) to a packet transmitted in every control period Tc1 to prevent the data size of each packet from exceeding its maximum permissible data size (control period Tc). The packet assignment of multiple transmission target data sets with the set transmission periods is performed in the order of the shorter transmission periods of the data sets.

Subsequently, the output information sets that need no synchronization are sequentially assigned to packets in the order of higher communication frequencies. With the communication parameters shown in FIG. 6, the assignment setting is determined to assign data elements B(1), B(2), B(3), and B(4) included in the output information set B(n), which has no sync setting and has the highest communication frequency with a frequency of once every reciprocal of the communication frequency Bf (=the control period Tc/the transmission period). The data elements may be assigned to different packets. The assignment is performed to satisfy the two conditions: the resultant assigned frequency will be a specified value; and the total packet occupied time of each packet does not exceed the control period. In other words, the data elements included in the output information set B are sequentially assigned to prevent the occupied ratio of each packet (the total packet occupied time/the control period Tc) from exceeding 1. The output information set B needs no synchronization. Thus, all the data elements may not be assigned to the same packet to achieve the requested communication frequency.

In the state shown in FIG. 7A, when, for example, the data element B(1) is assigned to the packet Nt1, the total packet occupied time is the packet occupied time Ap×the number of data elements Ac+the packet occupied time Dp×the number of data elements Dc+the packet occupied time Bp×(the number of data elements Bc−3)=155 μsec>the control period Tc. This does not satisfy the condition. In this case, the data element B(1) is assigned to the next packet 2.

In the state shown in FIG. 7B, all the data elements B(1), B(2), B(3), and B(4) included in the output information set B(n) have been assigned. In this state, the data elements B(1), B(2), and B(3) are assigned to each of the packets Nt2, Nt6, Nt10, . . . .

In the state shown in FIG. 7B, the total occupied time of each of the second packet, the sixth packet, the tenth packet, . . . is the packet occupied time Bp×(the number of data elements Bc−1)=105 μsec. This satisfies the condition: the packet occupied time Bp×(the number of data elements Bc−1)<the control period Tc (125 μsec).

In this case, the packet occupied time Bp×the number of data elements Bc=140 μsec>the control period Tc (125 μsec). Thus, the data element B(4) cannot be assigned to the same packet Nt2 as the packet to which the data elements B(1), B(2), and B(3) are assigned. Further, the total packet occupied time of the odd-numbered packet Nt3 is near its limiting value. In this case, the data element B(4) is inevitably assigned to the packet Nt4. In the same manner, the data element B(4) is assigned to each of the packets Nt4, Nt8, and Nt12, . . . .

Subsequently, the assignment setting is determined for the data elements C(1), C(2), C(3), and C(4) included in the output information set C(n). Each of the data elements C(1), C(2), C(3), and C(4) is assigned with a frequency of once every reciprocal of the communication frequency Cf (=the control period Tc/the transmission period). The data elements may be assigned to different packets. The assignment is performed to satisfy the two conditions: the resultant assigned frequency will be a specified value; and the total packet occupied time of each packet does not exceed the control period. In other words, the data elements included in the output information set C are sequentially assigned to prevent the occupied ratio of each packet (the total packet occupied time/the control period Tc) from exceeding 1. The output information set C needs no synchronization. Thus, all the data elements of the output information set C may not be assigned to the same packet to achieve the requested communication frequency.

In the state shown in FIG. 7B, the total occupied time of each of the packets Nt1, Nt2, and Nt3 is near its limiting value. In this case, the output information set C(n) is inevitably assigned to the packet Nt4. When two data elements of the output information set C(n) are to assigned, the packet occupied time Bp×(the number of data elements Bc−3)+the packet occupied time Cp×(the number of data elements Cc−2)=105 μsec<the control period Tc. In contrast, when three data elements of the output information set C(n) are to be assigned, the packet occupied time Bp×the number of data elements Bc+the packet occupied time Cp×(the number of data elements Cc−1)=140 μsec>the control period Tc. This allows assignment of only two data elements.

The total occupied time of each of the packets Nt5, Nt6, and Nt7 is near its limiting value. Thus, the remaining data elements included in the output information set C(n) are assigned to the packet Nt8. For the packet Nt8, the packet occupied time Bp×(the number of data elements Bc−3)+the packet occupied time Cp×(the number of data elements Cc−2)=105 μsec<the control period Tc.

In the state shown in FIG. 7C, all the data elements included in the output information sets A(n), B(n), C(n), and D(n) have been assigned. This assignment state is defined by the assignment setting 150 (FIG. 5).

If the condition for the total occupied time of each packet is not satisfied after any one of the output information sets that need no synchronization is assigned in the manner described above, the transmission period, the packet occupied time, the control period, and other parameters need to be changed.

FIG. 8 is a table showing the total occupied time and the occupied ratio when the output information sets shown in FIG. 7C are assigned to packets. As shown in FIG. 8, the total packet occupied time of any packet does not exceed the control period Tc (125 μsec). As a result, the occupied ratio of each packet is less than 1.

As described above, some applications may set whether a plurality of data elements included in an output information set need synchronization. For an output information set including a plurality of data elements, the assignment setting is determined to assign the plurality of data elements included in the output information set to the same packet (to a single packet or to a common packet) when the output information set has the sync setting. When the output information set has no sync setting and the plurality of data elements included in the output information set cannot be assigned to the same packet, the assignment setting is determined to assign the plurality of data elements to a plurality of packets. Among a plurality of transmission target output information sets, output information sets within the sync transmission setting are assigned to packets with a higher priority than other data.

With the procedure described above, each output information set is transmitted at the specified communication frequency, and each output information set is assigned as appropriate to satisfy the conditions including the total occupied time of each packet.

H. Procedure

Figure 9:
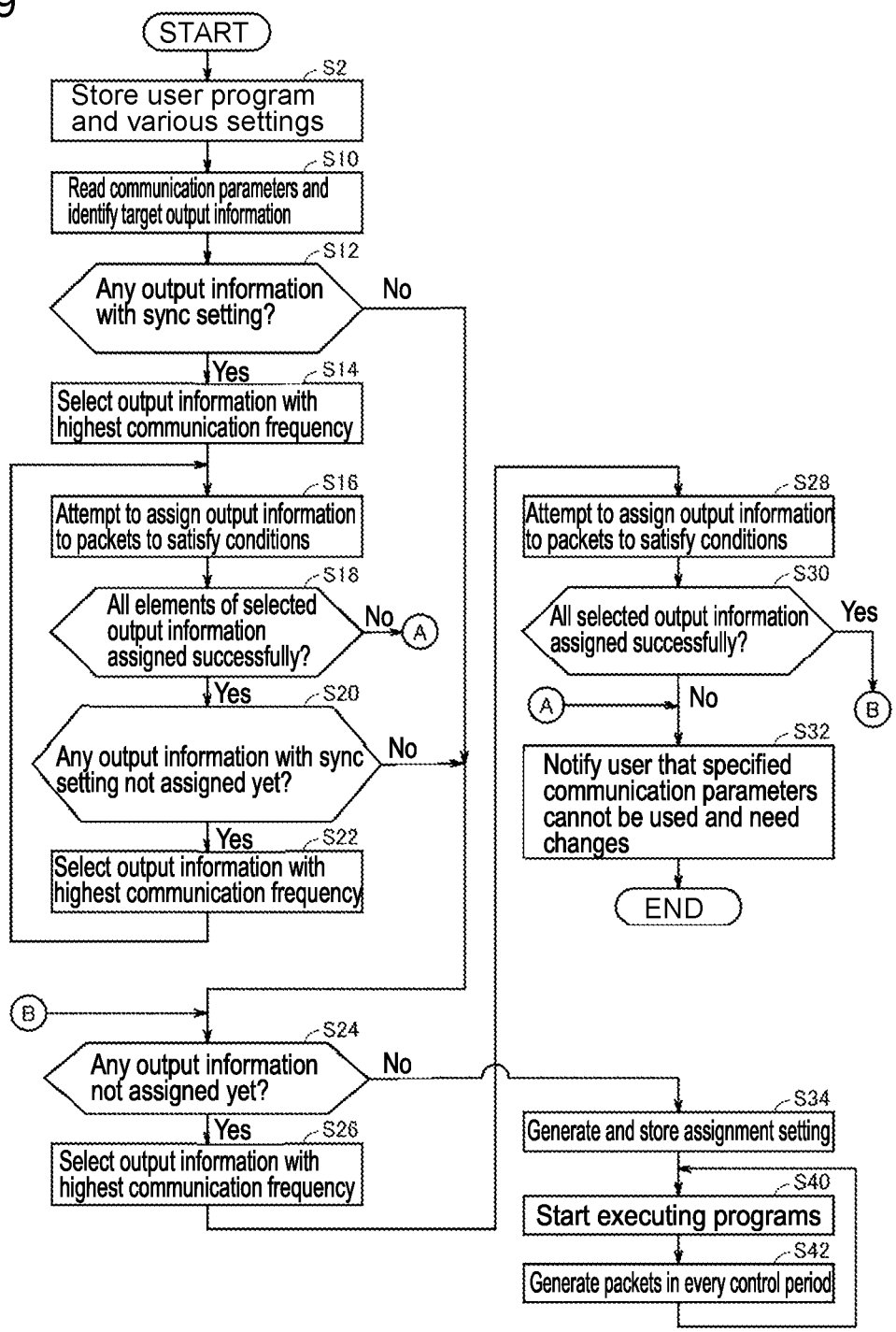
FIG. 9 is a flowchart showing the procedure used by the PLC system according to the present embodiment.

The procedure used by the PLC system 1 according to the present embodiment will now be described. FIG. 9 is a flowchart showing the procedure used by the PLC system 1 according to the present embodiment. The flowchart in FIG. 9 illustrates processes associated with the data transmission described above. The steps shown in FIG. 9 are typically implemented by the processor 100 included in the CPU 10 of the main processing device 2. However, the development support apparatus 500 may virtually implement the steps described below in an off-line environment. In other words, the development support apparatus 500 has substantially the same functions as the CPU 10 of the main processing device 2.

The processor 100 first receives the user program 105 and various settings, and stores the received program and settings in the non-volatile memory 104 (step S2). Subsequently, the processor 100 performs an assignment process (steps S10 to S34 described below) for transmitting output information sets calculated through the processes included in the user program 105 at specified communication frequencies.

More specifically, the processor 100 reads communication parameters (refer to FIG. 6 for example) that may be specified by a user, and identifies output information sets to be transmitted (target output information sets) (step S10). Subsequently, the processor 100 determines whether one or more of the target output information sets have the sync setting by referring to the read communication parameters (step S12). When one or more of the target output information sets have the sync setting (Yes in step S12), the processor 100 selects an output information set with the highest communication frequency from the output information sets with the sync setting (step S14). The processor 100 then attempts to assign the selected output information set to packets in a manner to satisfy the two conditions: the resultant assigned frequency will be a specified value; and the total packet occupied time of each packet does not exceed the control period (step S16). The processor 100 determines whether all the data elements of the selected output information set have been successfully assigned to packets (step S18).

When any of the data elements of the selected output information set has not successfully been assigned to packets (No in step S18), the processor 100 notifies the user that the communication with the specified communication parameters cannot be performed, and the transmission period, the packet occupied time, the control period, and other parameters need to be changed (step S32). The processing ends.

When all the elements of the selected output information set have been successfully assigned to packets (Yes in step S18), the processor 100 determines whether the output information sets with the sync setting include output information sets that have not been assigned to packets yet (step S20). When one or more of the output information sets with the sync setting have not been assigned to packets yet (Yes in step S20), the processor 100 selects an output information set with the highest communication frequency from the output information sets that have not been assigned to packets yet (step S22). The processor 100 then repeats the processing in step S16 and subsequent steps.

When all the output information sets with the sync setting have been completely assigned to packets (No in step S20) or when no output information set has the sync setting (No in step S12), the processor 100 determines whether any output information sets have not been assigned to packets yet (step S24).

When any output information sets have not been assigned to packets yet (Yes in step S24), the processor 100 selects an output information set with the highest communication frequency from the output information sets that have not been assigned to packets yet (step S26). The processor 100 attempts to assign the selected output information set to packets to satisfy the two conditions: the resultant assigned frequency will be a specified value; and the total packet occupied time of each packet does not exceed the control period (step S28). The processor 100 determines whether all of the selected output information sets have been successfully assigned to packets (step S30).

When all the selected output information sets have not been successfully assigned to packets (No in step S30), the processing advances to step S32.

When all the selected output information sets have been successfully assigned to packets (Yes in step S30), the processor 100 repeats the processing in step S24 and subsequent steps.

Finally, when all the output information sets have been completely assigned to packets (No in step S24), the processor 100 generates the assignment setting 150 indicating the completion of the assignment, and stores the assignment setting (step S34).

Subsequently, the processor 100 starts executing programs to control the control targets in response to either an explicit or implicit instruction (including the user program 105 and the system program 106) (step S40). The processor 100 then determines the packet assignment for information calculated by executing the programs in accordance with the assignment setting 150 stored in step S34, and generates packets in every control period (step S42). The processing in steps S40 and S42 will then be repeated.

I. User Support Capabilities

In the packet assignment process described above, each output information set is basically automatically assigned to packets in accordance with the set communication parameters. In addition to this, the support capabilities to further optimize the assignment results will now be described. More specifically, the guidance capabilities for correcting the assignment when the predetermined communication parameters cannot be set will now be described. Further, the capabilities for notifying the user whether the control period can further be shortened for the predetermined communication parameters will now be described. These capabilities may support the user and enhance usability.

For example, the total occupied time of each packet shown in FIG. 8 may be calculated for the assignment results. The total occupied time of each packet shown in FIG. 8 may be presented to the user in any form (in a list or in a graph). In other words, the packet assignment process according to the present embodiment includes notifying the occupied state of data assigned to each packet (for example, the occupied ratio or the occupied time).

When the assignment is determined for output information sets with the sync setting, the total occupied time in any packet exceeding the control period is determined to be an error. In other words, the packet assignment process according to the present embodiment includes providing a prompt to change the communication parameters when the data elements to be assigned cannot be assigned in accordance with the predetermined communication parameters including the control period and the transmission period.

In that case, the adjustments to eliminate errors may be performed with the technique described below.

(1) The control period is increased to accommodate the total occupied time of each packet. In this case, a message may be provided to the user indicating the degree by which the control period can increase to eliminate errors. In other words, the maximum value of the total occupied time calculated for each packet may be presented to the user and guide the user to increase the control period to exceed the maximum value. In some embodiments, the control period may be increased automatically.

(2) The total occupied time of each packet is decreased to be within the control period. In this case, a fewer number of output information sets are assigned to each packet to shorten the total occupied time of each packet. In some embodiments, the settings for output information sets with the sync setting may be changed.

To allow efficient use of the field network 4, the approaches described below may be used. The approaches refer to the results indicating the total occupied time and the occupied ratio of each packet to which output information sets have been assigned as shown in FIG. 8.

The highest occupied ratio of the odd-numbered packets Nt1, Nt3, Nt5, Nt7 . . . to which output information sets with the sync setting have been assigned can approach 1.

The packet occupied time of each output information set can be extended or the control period can be shortened.

An output information set (e.g., an output information set E) can be added until the packet occupied ratio approaches 1.

The amount of information to be transmitted can be increased by extending the packet occupied time until the packet occupied ratio approaches 1.

J. Data Reception in Slave Devices

As described above, the PLC system 1 according to the present embodiment uses data stored in packets that are transmitted in every control period with the data structure that is not fixed but changes dynamically. Thus, the destination of data included in each packet is also not fixed. A data reception process performed by each slave device for receiving packets storing data that changes with time will now be described.

Figure 10A:
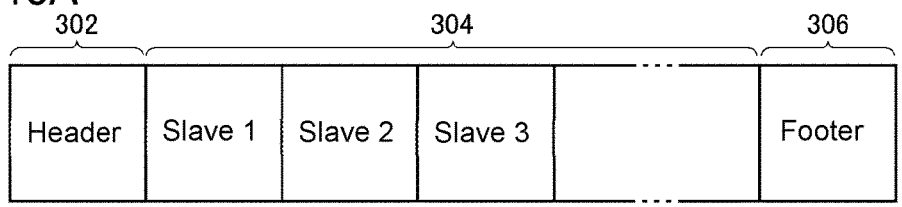
FIGS. 10A to 10C are diagrams showing examples of the data structure of a packet used in the PLC system according to the present embodiment.
Figure 10B:
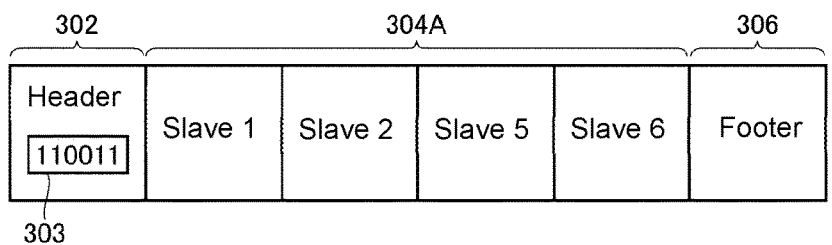
Figure 10C:
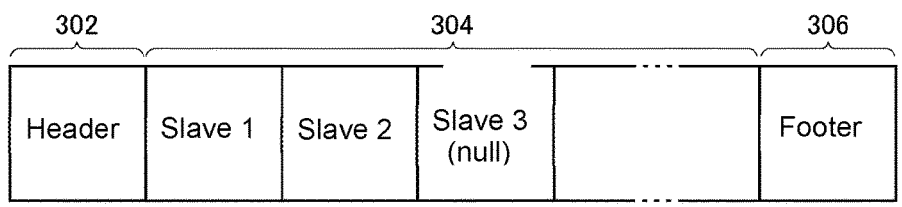

FIGS. 10A to 10C are diagrams showing examples of the data structure of a packet used in the PLC system 1 according to the present embodiment. FIG. 10A shows a typical data structure. A packet with the data structure shown in FIG. 10A includes a header 302, a data area group 304, and a footer 306. The data area group 304 includes sections in correspondence with destination slave devices, and stores transmission target data. With a data area assigned to the device from the data area group 304 being known, each slave device receiving the packet shown in FIG. 10A extracts data intended for the slave device from its assigned data area.

FIG. 10B shows the data structure of a packet used in the PLC system 1 according to the present embodiment. In the present embodiment, as described above, the destinations of data sets stored in each packet change with time. Each packet stores, in its header 302, identification information 303 for specifying slave devices intended as its destinations.

Each slave device, which has received the packet shown in FIG. 10B, determines whether the data area group 304 includes a data area assigned to the device by referring to the identification information 303 in the header 302, and further identifies the data area assigned to the device. In the example shown in FIG. 10B, a flag carrying 0 and 1 is used as the identification information 303. The flag indicates that the packet stores data intended for the first and second slave devices from the start of the packet, or namely the slave devices 1 and 2. The flag carrying 0 for the third and the fourth positions indicates that the packet stores no data for the third and fourth slave devices from the start of the packet, or namely the slave devices 3 and 4. The slave devices 3 and 4 receiving the packet shown in FIG. 10B extract no data from the packet, and directly transfer the packet to a subsequent slave device.

In contrast, the fifth and sixth slave devices from the start of the packet, or namely the slave devices 5 and 6, determine that the packet stores data intended for the slave devices, and extract data intended for the slave devices from their corresponding data areas.

In this manner, the identification information 303 allows reliable transmission of target data to target slave devices when the destinations of data included in each packet change with time. More specifically, the main processing device 2 (master device) stores the identification information 303 indicating destination remote device 40 (slave device) to which data is to be transmitted and the data in the packet. Each remote device 40 (slave device) extracts only data intended for the device from the data included in the packet transmitted from the main processing device 2 (master device).

FIG. 10C shows another data structure of a packet used in the PLC system 1 according to the present embodiment. The data structure shown in FIG. 10C, which is similar to the data structure shown in FIG. 10A, can dynamically change the size of each data area in the data area group 304. For slave devices for which no data is to be transmitted, invalid data (e.g., null code) is input in their corresponding data areas. Each slave device determines that no data is intended for the slave when a null code is input in a data area assigned to the device, and directly transfers the packet to a subsequent slave device without extracting any data from the packet.

Each packet may store the destination of data in the corresponding data area of the data area group 304, instead of storing the destination in the header 302.

This data structure can change the packet size dynamically while maintaining the framework of the data area group 304. This achieves control with requested control periods.

K. Modification

Although the field network in the above embodiment has the ring topology, the field network may be a daisy-chain network. The field network with the daisy chain topology will now be described with reference to FIG. 11.

Figure 11:
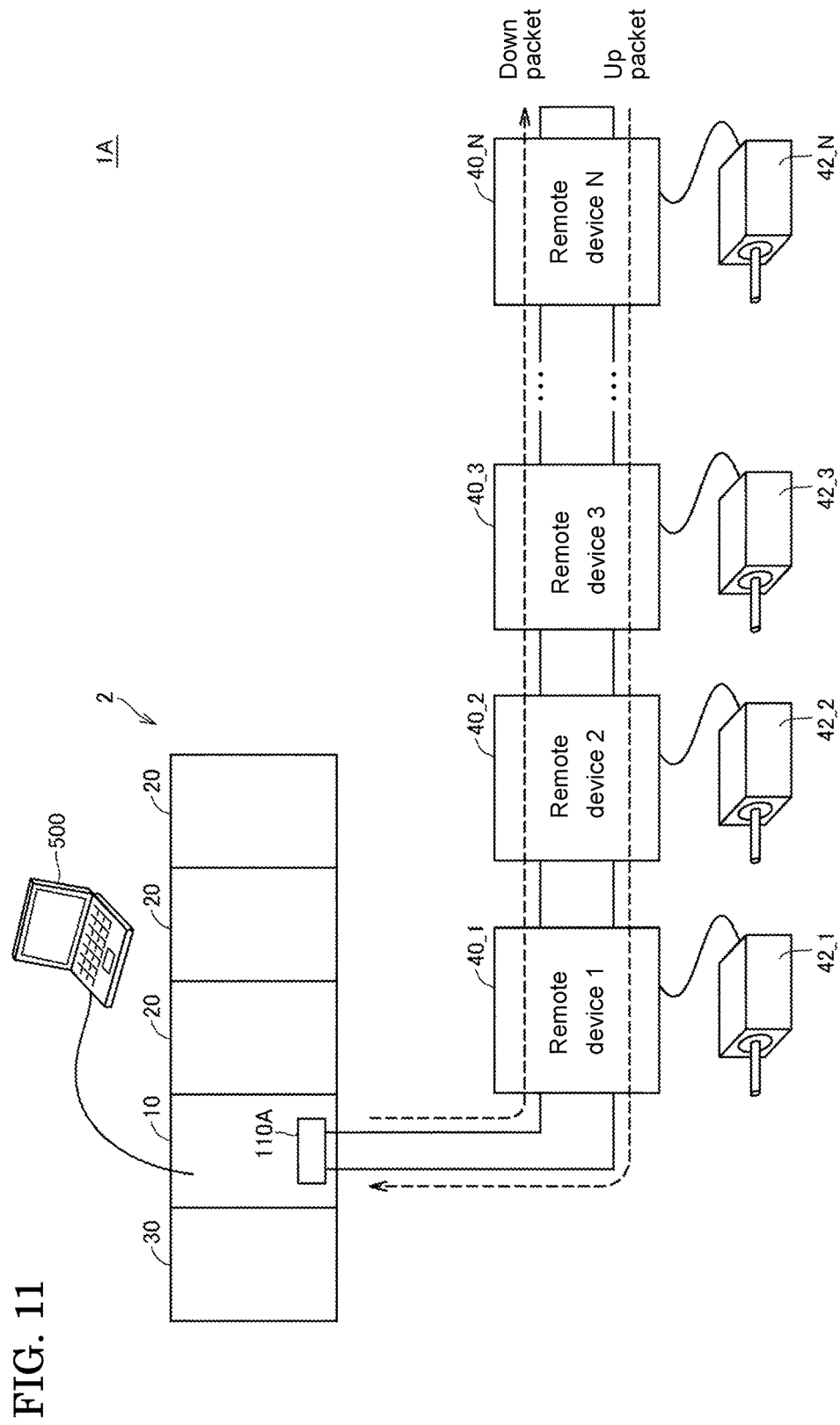
FIG. 11 is a schematic diagram showing the overall configuration of a PLC system according to a modification of the embodiment.

FIG. 11 is a schematic diagram showing the overall configuration of a PLC system 1A according to a modification of the present embodiment. As shown in FIG. 11, the PLC system 1A includes a main processing device 2 (master device), and one or more remote devices 40 (slave devices), which are connected to each other with a field network having a daisy chain topology. In the field network, packets are sequentially transferred from the master device to the slave devices (down-packets), the transfer direction is reversed at the end of the path, and are sequentially transferred from the slave devices to the master device (up-packets).

In the system with the daisy chain topology, the CPU 10 includes a communication processing unit 110A suited to the daisy chain topology. The other components and processes are the same as those described above, and will not be described in detail.

Although the above embodiment and its modification describe the data transmission in the field network, the data transmission is also applicable to the internal bus connecting the CPU 10 and the IO units 20 in each PLC.

L. Other Embodiments

The assignment capabilities according to the present embodiment are not limited to the above examples, and may be modified variously. The main processing device 2 (master device) as the controller may have all the assignment capabilities, or the development support apparatus 500 may have substantially all the assignment capabilities. The main processing device 2 (master device) and the development support apparatus 500 may communicate with each other to implement the assignment capabilities. Various embodiments may be used as appropriate in accordance with the system configuration, the cost, and other associated factors.

M. Advantageous Effects

The embodiments allow the master device to transmit necessary data to the plurality of slave devices connected to the same network as appropriate with the update frequencies determined in accordance with the functions or processes to be implemented by each slave device, and thus enable effective use of the predefined bandwidths of the network. Without the need to transmit unnecessary data on the network, the control period can be shortened to achieve faster communications.

The embodiments disclosed herein are only illustrative in all respects and should not be construed to be restrictive. The scope of the invention is designated by the appended claims, and it is intended that all changes are contained in the claims and equivalent meanings and ranges.

REFERENCE SIGNS LIST 1, 1A PLC system
2 main processing device
4 field network
10 CPU
20 IO unit
30 power supply unit
40 remote device
42 servo motor
100 processor
102 main memory
103 work area
104 non-volatile memory
105 user program
106 system program
108 internal bus controller
109 internal bus
110, 110A, 410 communication processing unit
112, 412 communication controller
114, 414 shared memory
120, 420 transmission buffer
122, 422 transmission circuit
130, 430 reception buffer
132, 432 reception circuit
150 assignment setting
400 computation processing unit
402 input circuit
404 output circuit
500 development support apparatus

The invention claimed is:

1. A control system for controlling a control target, the control system comprising:
a master device comprising a processor; and
a plurality of slave devices each comprising a computation processor, the plurality of slave devices connected to the master device with a network, wherein:
the processor of the master device is configured with a program to perform operations comprising transmitting packets via the network in one or more control periods set according to a predetermined control period length,
each of the computation processors of the plurality of slave devices are configured with a program to perform operations comprising sequentially transferring packets transmitted from the master device,
the processor of the master device is configured with the program to perform operations further comprising:
repeatedly executing a program comprising input and output processes to calculate first data and second data;
assigning the first data to a packet to be transmitted in first ones of the control periods occurring according to a first transmission period and assigning the second data to a packet to be transmitted in second ones of the control periods occurring according to a second transmission period, the first transmission period having a first length that is a first integer multiple of the predetermined control period length and the second transmission period having a second length that is a second integer multiple of the predetermined control period length such that the second transmission period is longer than the first transmission period; and
storing each of the first data and the second data in the packet together with information indicating a slave device of the plurality of slave devices that is a transmission destination of the packet, and
the computation processor of the respective slave device that is the transmission destination of the packet is configured with the program to perform operations further comprising extracting data intended for the respective slave device that is the transmission destination from the packet.

2. The control system according to claim 1, wherein
the processor of the master device is configured with the program to perform operations comprising determining the packets to which the first data and the second data are to be assigned in a manner not to exceed a maximum permissible data size of each packet.

3. The control system according to claim 1, wherein
the processor of the master device is configured with the program to perform operations comprising assigning the first data and the second data to packets in an order of shorter transmission periods to longer transmission periods.

4. The control system according to claim 1, wherein
the second data comprises a plurality of data elements, and
the processor of the master device is configured with the program to perform operations comprising assigning the plurality of data elements included in the second data to the same packet when the second data has a synchronization transmission setting, and assigning the plurality of data elements included in the second data to a plurality of packets when the second data has no synchronization transmission setting.

5. The control system according to claim 4, wherein
the processor of the master device is configured with the program to perform operations comprising assigning the first data or the second data having the synchronization transmission setting to packets with a higher priority than the first data or the second data not having the synchronization transmission setting.

6. The control system according to claim 1, wherein
the processor of the master device is further configured with the program to perform operations comprising notifying of an occupied state of each packet according to data assigned to each packet.

7. The control system according to claim 1, wherein
the processor of the master device is further configured with the program to perform operations comprising providing a prompt to change predetermined communication parameters comprising the control period, the first transmission period, and the second transmission period in response to being unable to assign the first data and the second data to packets in accordance with the predetermined communication parameters.

8. A development support apparatus for a control system configured to control a control target, wherein
the control system comprises a master device comprising a processor and a plurality of slave devices, each comprising a computation processor, connected to the master device with a network,
the processor of the master device is configured with a program to perform operations comprising transmitting packets via the network in one or more control periods set according to a predetermined control period length, and
the computation processors of the plurality of slave devices are configured with a program to perform operations comprising sequentially transferring packets transmitted from the master device,
the development support apparatus comprising a processor configured with a program to perform operations comprising:
receiving, when the processor of the master device repeatedly executes a user program comprising input and output processes to calculate first data and second data, predetermined communication parameters comprising a first transmission period having a first length that is a first integer multiple of the predetermined control period length and a second transmission period having a second length that is a second integer multiple of the predetermined control period length such that the second transmission period is longer than the first transmission period, and
assigning the first data to a packet to be transmitted in first ones of the control periods occurring according to the first transmission period and assigning the second data to a packet to be transmitted in second ones of the control periods occurring according to the second transmission period.

9. A controller connected to a plurality of slave devices with a network, the controller transmitting packets via the network in one or more control periods set according to a predetermined control period length, the plurality of slave devices sequentially transferring packets transmitted from the controller,
the controller comprising a processor configured with a program to perform operations comprising:
repeatedly executing a program comprising input and output processes to calculate first data and second data;

assigning, the first data to a packet to be transmitted in first ones of the control periods occurring according to a first transmission period and assigning the second data to a packet to be transmitted in second ones of the control periods occurring according to a second transmission period, the first transmission period having a first length that is a first integer multiple of the predetermined control period length and the second transmission period having a second length that is a second integer multiple of the predetermined control period length such that the second transmission period is longer than the first transmission period; and
storing each of the first data and the second data in the packet together with information indicating a slave device of the plurality of slave devices that is a transmission destination of the packet, wherein
the slave device that is the transmission destination of the packet extracts data intended for the slave device that is the transmission destination from the packet.

10. A development support apparatus for a control system configured to control a control target, wherein
the control system comprises a master device comprising a processor and a plurality of slave devices, each comprising a computation processor, connected to the master device with a network,
the processor of the master device is configured with a program to perform operations comprising transmitting packets via the network in one or more control periods set according to a predetermined control period length,
the computation processors of the plurality of slave devices are configured with a program to perform operations comprising sequentially transferring packets transmitted from the master device, and
the processor of the master device is configured with the program to perform operations further comprising:
repeatedly executing a program comprising input and output processes to calculate first data and second data,
the development support apparatus comprising a processor configured with a program to perform operations comprising:
assigning the first data to a packet to be transmitted in first ones of the control periods occurring according to a first transmission period and assigning the second data to a packet to be transmitted in second ones of the control periods occurring according to a second transmission period, the first transmission period having a first length that is a first integer multiple of the predetermined control period length and the second transmission period having a second length that is a second integer multiple of the control period length such that the second transmission period is longer than the first transmission period.

11. A control method implemented in a control system configured to control a control target, the control system comprising a master device and a plurality of slave devices connected to the master device with a network, the control method comprising:
transmitting, by the master device, packets via the network in one or more control periods set according to a predetermined control period length,
sequentially transferring, by the plurality of slave devices, packets transmitted from the master device;
repeatedly executing, by the master device, a program comprising input and output processes to calculate first data and second data;

assigning, the first data to a packet to be transmitted in first ones of the control periods according to a first transmission period and assigning the second data to a packet to be transmitted in second ones of the control periods occurring according to a second transmission period, the first transmission period having a first length that is a first integer multiple of the predetermined control period length and the second transmission period having a second length that is a second integer multiple of the predetermined control period length such that the second transmission period is longer than the first transmission period;

storing, by the master device, each of the first data and the second data in the packet together with information indicating a slave device of the plurality of slave devices that is a transmission destination of the packet; and extracting, by the slave device that is the transmission destination of the packet, data intended for the slave device that is the transmission destination of the packet from the packet.

12. The method according to claim 11, wherein the first data and the second data are assigned to packets so as not to exceed a maximum permissible data size of each packet.

13. The method according to claim 11, wherein the first data and the second data are assigned to packets in an order of shorter transmission periods to longer transmission periods.

14. The method according to claim 11, wherein the second data comprises a plurality of data elements, and the plurality of data elements is assigned to the same packet when the second data has a synchronization transmission setting and the plurality of data elements is assigned to a plurality of packets when the second data has no synchronization transmission setting.

15. The method according to claim 14, wherein first data or the second data having the synchronization transmission setting is assigned to packets with a higher priority than the first data or the second data not having the synchronization transmission setting.

16. The method according to claim 11, further comprising notifying of an occupied state of each packet according to data assigned to each packet.

17. The method according to claim 11, further comprising providing a prompt to change predetermined communication parameters comprising the control period, the first transmission period, and the second transmission period in response to being unable to assign the first data and the second data to packets in accordance with the predetermined communication parameters.

* * * * *